US011030384B2

(12) United States Patent
Ionescu et al.

(10) Patent No.: US 11,030,384 B2
(45) Date of Patent: *Jun. 8, 2021

(54) IDENTIFICATION OF SEQUENTIAL BROWSING OPERATIONS

(71) Applicant: International Business Machines Corporation, Armonk, NY (US)

(72) Inventors: Paul Ionescu, Kanata (CA); Iosif Viorel Onut, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,932

(22) Filed: Jun. 6, 2019

(65) Prior Publication Data
US 2019/0286687 A1    Sep. 19, 2019

Related U.S. Application Data

(63) Continuation of application No. 14/026,223, filed on Sep. 13, 2013, now Pat. No. 10,353,984.

(30) Foreign Application Priority Data

Sep. 14, 2012    (CA) ................................ CA 2789936

(51) Int. Cl.
G06F 40/103      (2020.01)
G06F 16/958      (2019.01)
G06F 7/02        (2006.01)

(52) U.S. Cl.
CPC .......... *G06F 40/103* (2020.01); *G06F 16/958* (2019.01); *G06F 7/02* (2013.01)

(58) Field of Classification Search
CPC ......... G06F 16/958; G06F 40/103; G06F 7/02
See application file for complete search history.

(56) References Cited

U.S. PATENT DOCUMENTS 6,243,091 B1    6/2001  Berstis
6,393,479 B1    5/2002  Glommen
(Continued)

FOREIGN PATENT DOCUMENTS

CA    2286534 A1    4/2001
CA    2605823 A1    4/2009
(Continued)

OTHER PUBLICATIONS

Cooley, R. et al., "Data Preparation for Mining World Wide Web Browsing Patterns," [online] Knowledge and Information Systems, vol. 1, No. 1, pp. 5-32, 1999 [retrieved Sep. 13, 2013], retrieved from the Internet: <facweb.cs.depaul.edu/mobasher/research/papers/webminer-kais.pdf>, 26 pg.

(Continued)

*Primary Examiner* — Kyle R Stork
(74) *Attorney, Agent, or Firm* — Cuenot, Forsythe & Kim, LLC

(57) ABSTRACT

Identifying sequential browsing operations includes receiving session data associated with a plurality of sessions, creating a reduced page for each page in a series of pages associated with a first session in the plurality of sessions, and creating a hash value associated with each reduced page for each page in the series of pages associated with the first session of the plurality of sessions. Responsive to a determination that the hash value of the first session is equivalent to the hash value of the second session, an associated page is identified as an equivalent page and the equivalent pages are merged to create a common sequence without a need to resend requests associated with the session data to a server.

14 Claims, 8 Drawing Sheets

(56) References Cited

U.S. PATENT DOCUMENTS

| | | | |
|---|---|---|---|
| 6,742,030 B1 | 5/2004 | MacPhail | |
| 7,028,306 B2 | 4/2006 | Boloker | |
| 7,809,801 B1 | 10/2010 | Wang | |
| 7,990,383 B1 | 8/2011 | Perttunen | |
| 8,065,410 B1 | 11/2011 | Breen | |
| 8,180,778 B1 | 5/2012 | Pedersen | |
| 8,229,969 B1 | 7/2012 | Floyd | |
| 8,601,565 B1 | 12/2013 | Sakata | |
| 9,336,321 B1 | 5/2016 | Hayden | |
| 10,353,984 B2* | 7/2019 | Ionescu | G06F 16/958 |
| 2002/0038319 A1* | 3/2002 | Yahagi | G06F 40/14 |
| | | | 715/234 |
| 2002/0065912 A1* | 5/2002 | Catchpole | G06F 16/954 |
| | | | 709/224 |
| 2002/0130907 A1 | 9/2002 | Chi | |
| 2002/0133627 A1 | 9/2002 | Maes | |
| 2003/0177442 A1 | 9/2003 | Lou | |
| 2004/0003351 A1 | 1/2004 | Sommerer | |
| 2004/0254905 A1 | 12/2004 | Tiku | |
| 2005/0066169 A1 | 3/2005 | Kiehtreiber | |
| 2005/0132018 A1 | 6/2005 | Milic-Frayling | |
| 2005/0208930 A1 | 9/2005 | Zmrzli | |
| 2006/0015504 A1 | 1/2006 | Yu | |
| 2006/0064674 A1 | 3/2006 | Olson | |
| 2006/0070012 A1 | 3/2006 | Milener | |
| 2006/0074984 A1 | 4/2006 | Milener | |
| 2007/0038952 A1 | 2/2007 | Reponen | |
| 2007/0050844 A1 | 3/2007 | Lebel | |
| 2007/0124693 A1 | 5/2007 | Dominowska | |
| 2007/0250634 A1 | 10/2007 | Knitter | |
| 2007/0271230 A1 | 11/2007 | Hart | |
| 2008/0034073 A1 | 2/2008 | McCloy, III | |
| 2008/0235163 A1 | 9/2008 | Balasubramanian | |
| 2008/0263026 A1 | 10/2008 | Sasturkar | |
| 2008/0270437 A1 | 10/2008 | Kahn | |
| 2008/0313123 A1 | 12/2008 | Galvin | |
| 2009/0037517 A1 | 2/2009 | Frei | |
| 2009/0049062 A1* | 2/2009 | Chitrapura | G06F 16/986 |
| 2009/0063547 A1 | 3/2009 | Wright | |
| 2009/0254574 A1 | 10/2009 | De | |
| 2010/0070856 A1 | 3/2010 | Behl | |
| 2010/0241940 A1 | 9/2010 | Rao | |
| 2010/0306315 A1 | 12/2010 | Smith | |
| 2011/0078140 A1 | 3/2011 | Dube | |
| 2011/0173526 A1 | 7/2011 | Schwarzbauer | |
| 2011/0258532 A1 | 10/2011 | Ceze | |
| 2011/0264673 A1 | 10/2011 | White | |
| 2012/0110437 A1 | 5/2012 | Pan | |
| 2012/0151361 A1 | 6/2012 | Burton | |
| 2012/0210237 A1 | 8/2012 | Coleman | |
| 2012/0304082 A1 | 11/2012 | Patten | |
| 2013/0019161 A1 | 1/2013 | McConnell | |
| 2013/0080421 A1 | 3/2013 | Taylor | |
| 2013/0080576 A1 | 3/2013 | Taylor | |
| 2013/0080867 A1 | 3/2013 | Vandervort | |
| 2013/0145255 A1 | 6/2013 | Zheng | |
| 2014/0006293 A1 | 1/2014 | Chang | |
| 2014/0082480 A1 | 3/2014 | Ionescu et al. | |
| 2014/0344660 A1 | 11/2014 | Hayden | |
| 2015/0172359 A1 | 6/2015 | Taylor | |

FOREIGN PATENT DOCUMENTS

| | | |
|---|---|---|
| CA | 2706743 A1 | 9/2010 |
| CA | 2789936 A1 | 3/2014 |
| WO | 0248899 W | 6/2002 |

OTHER PUBLICATIONS

Hong, T.P. et al., "Mining weighted linguistic browsing patterns from log data on web servers," [online] Nat'l. Univ. of Kaohsiung, Taiwan, Department of Computer Science and Information Engineering Paper, 2006 [retrieved Sep. 13, 2013] retrieved from the Internet: <http://ir.nuk.edu.tw:8080/ir/bitstream/310360000Q/13654/2/Mining+Weighted+Linguistic+Browsing+Patterns+from+Log+Data+on+Web+Servers.pdf>, 13 pg.

U.S. Appl. No. 14/026,223, Non-Final Office Action, dated Oct. 9, 2015, 14 pg.

U.S. Appl. No. 14/026,223, Final Office Action, dated Mar. 25, 2016, 16 pg.

U.S. Appl. No. 14/026,223, Advisory Action, dated Jun. 9, 2016, 3 pg.

U.S. Appl. No. 14/026,223, Non-Final Office Action, dated Aug. 24, 2016, 17 pg.

U.S. Appl. No. 14/026,223, Final Rejection, dated Mar. 23, 2017, 19 pg.

U.S. Appl. No. 14/026,223, Examiner's Answer, dated Nov. 17, 2017, 6 pg.

U.S. Appl. No. 14/026,223, Decision on Appeal, Dec. 6, 2018, 12 pg.

U.S. Appl. No. 14/026,223, Notice of Allowance, dated Mar. 6, 2019, 5 pg.

* cited by examiner

Identification system
300

IDENTIFICATION OF SEQUENTIAL BROWSING OPERATIONS

CROSS-REFERENCE TO RELATED APPLICATIONS

This application claims the benefit of Canada Application Number 2789936 filed on Sep. 14, 2012, which is fully incorporated herein by reference.

BACKGROUND

Sequential browsing operations are series or sequences of element selections, typically associated with clicks (pointing device click) and/or hypertext transport protocol (HTTP) requests that are interdependent. Interdependence in the series means a third request in a sequence of requests cannot be valid when a first request and second request have not been sent previously to a server. For example, sequential browsing operations include a sequence of operations used in completing an online purchase, registering for a user account, and in completing an online test.

There is a need to identify sequences determined as sequential browsing operations because when performing an automated test re-sending a set of requests in a same order as originally recorded is required for the test to be validated. A challenge arises in identifying the operation sequences in an automated fashion within a context of capturing browsing data from various network sources and leveraging the data.

Using an example of security testing, identification of sequential browsing operations may improve crawling coverage of dynamic analysis web security scanners by using web traffic information collected from network nodes and server logs. In another related example, a system may enhance manual web application functional testing processes as part of a quality assurance process by using identification of sequential browsing operations to streamline application security testing.

Solutions are available for identifying request dependencies from known sequences of requests defined by users. Techniques for constructing crawling strategies to identify request dependencies as part of automated crawling of a web site by a testing tool are also available. However available solutions are typically satisfactory. In the first case, the solution typically validates only an already existing sequence constructed by a user. In the second case, a re-exploration of a site is typically required, which defeats the initial purpose imposing high cost in terms of time and processing resource. In another approach, entire collected data can be used as a sequence and then used in validation solution. However using this approach may prove to be costly in terms of time and processing resource because the validation method consists of re-sending requests in various combinations and performing comparisons of the test responses received against original response data.

BRIEF SUMMARY

A computer-implemented process for identifying sequential browsing operations includes receiving session data associated with a plurality of sessions, creating, using a processor, a reduced page for each page in a series of pages associated with a first session in the plurality of sessions, creating a hash value associated with each reduced page for each page in the series of pages associated with the first session of the plurality of sessions, and comparing each hash value associated with the first session to each hash value associated with a respective reduced page in a series of pages associated with a second session in the plurality of sessions. The computer-implemented method also includes determining whether the hash value of the first session is equivalent to the hash value of the second session and, responsive to a determination that the hash value of the first session is equivalent to the hash value of the second session, identifying an associated page as an equivalent page. Using the processor, equivalent pages are merged to create a common sequence without a need to resend requests associated with the session data to a server.

A computer program product for identifying sequential browsing operations includes a non-transitory computer recordable-type media containing computer executable program code stored thereon. The computer executable program code includes computer executable program code for receiving session data associated with a plurality of sessions, computer executable program code for creating a reduced page for each page in a series of pages associated with a first session in the plurality of sessions, computer executable program code for creating a hash value associated with each reduced page for each page in the series of pages associated with the first session of the plurality of sessions, and computer executable program code for comparing each hash value associated with the first session to each hash value associated with a respective reduced page in a series of pages associated with a second session in the plurality of sessions. The computer executable program code also includes computer executable program code for determining whether the hash value of the first session is equivalent to the hash value of the second session and computer executable program code responsive to a determination that the hash value of the first session is equivalent to the hash value of the second session, for identifying an associated page as an equivalent page. The computer executable code further includes computer executable program code for merging equivalent pages to create a common sequence without a need to resend requests associated with the session data to a server.

An apparatus for identifying sequential browsing operations includes a memory storing computer executable program code and a processor unit connected to the memory. The processor unit executes the computer executable program code to direct the apparatus to receive session data associated with a plurality of sessions, create a reduced page for each page in a series of pages associated with a first session in the plurality of sessions, create a hash value associated with each reduced page for each page in the series of pages associated with the first session of the plurality of sessions, and compare each hash value associated with the first session to each hash value associated with a respective reduced page in a series of pages associated with a second session in the plurality of sessions. The processor unit also executes the computer executable program code to direct the apparatus to determine whether the hash value of the first session is equivalent to the hash value of the second session and responsive to a determination that the hash value of the first session is equivalent to the hash value of the second session, identify an associated page as an equivalent page. The processor unit further executes the computer executable program code to direct the apparatus to merge equivalent pages to create a common sequence without a need to resend requests associated with the session data to a server.

BRIEF DESCRIPTION OF THE SEVERAL VIEWS OF THE DRAWINGS

For a more complete understanding of this disclosure, reference is now made to the following brief description.

DETAILED DESCRIPTION

Figure 1:
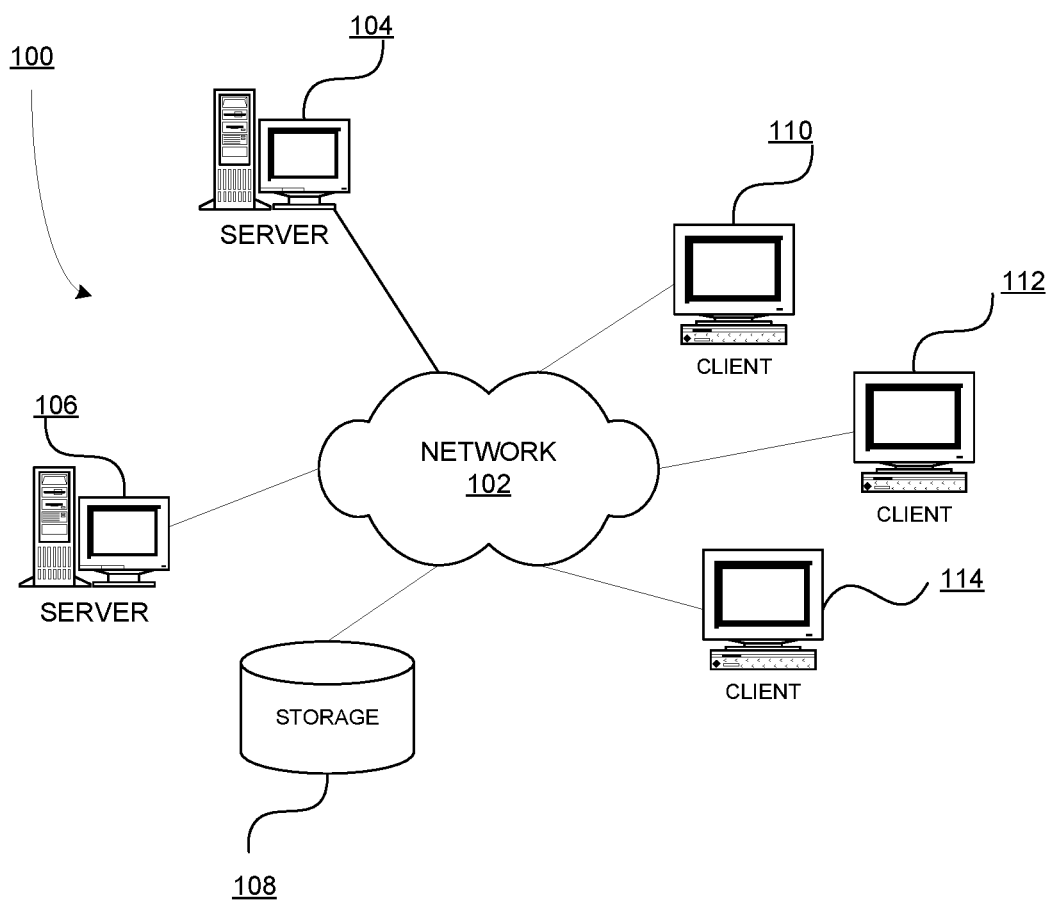
FIG. 1 is a block diagram of an exemplary network data processing system operable for various embodiments of the disclosure.

This disclosure relates generally to information and data management in a data processing system and more specifically to identification of sequential browsing operations in the data processing system.

According to one embodiment, a computer-implemented process for identifying sequential browsing operations receives session data associated with a plurality of sessions, creates a reduced page for each page in a series of pages associated with a first session in the plurality of sessions, creates a hash value associated with each reduced page for each page in the series of pages associated with the first session of the plurality of sessions and compares each hash value associated with the first session to each hash value associated with a respective reduced page in a series of pages associated with a second session in the plurality of sessions. The computer-implemented process determines whether the hash value of the first session is equivalent to the hash value of the second session. Responsive to a determination that the hash value of the first session is equivalent to the hash value of the second session, the computer implemented process identifies an associated page as an equivalent page and merges equivalent pages to create a common sequence without a need to resend requests associated with the session data to a server.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java °, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
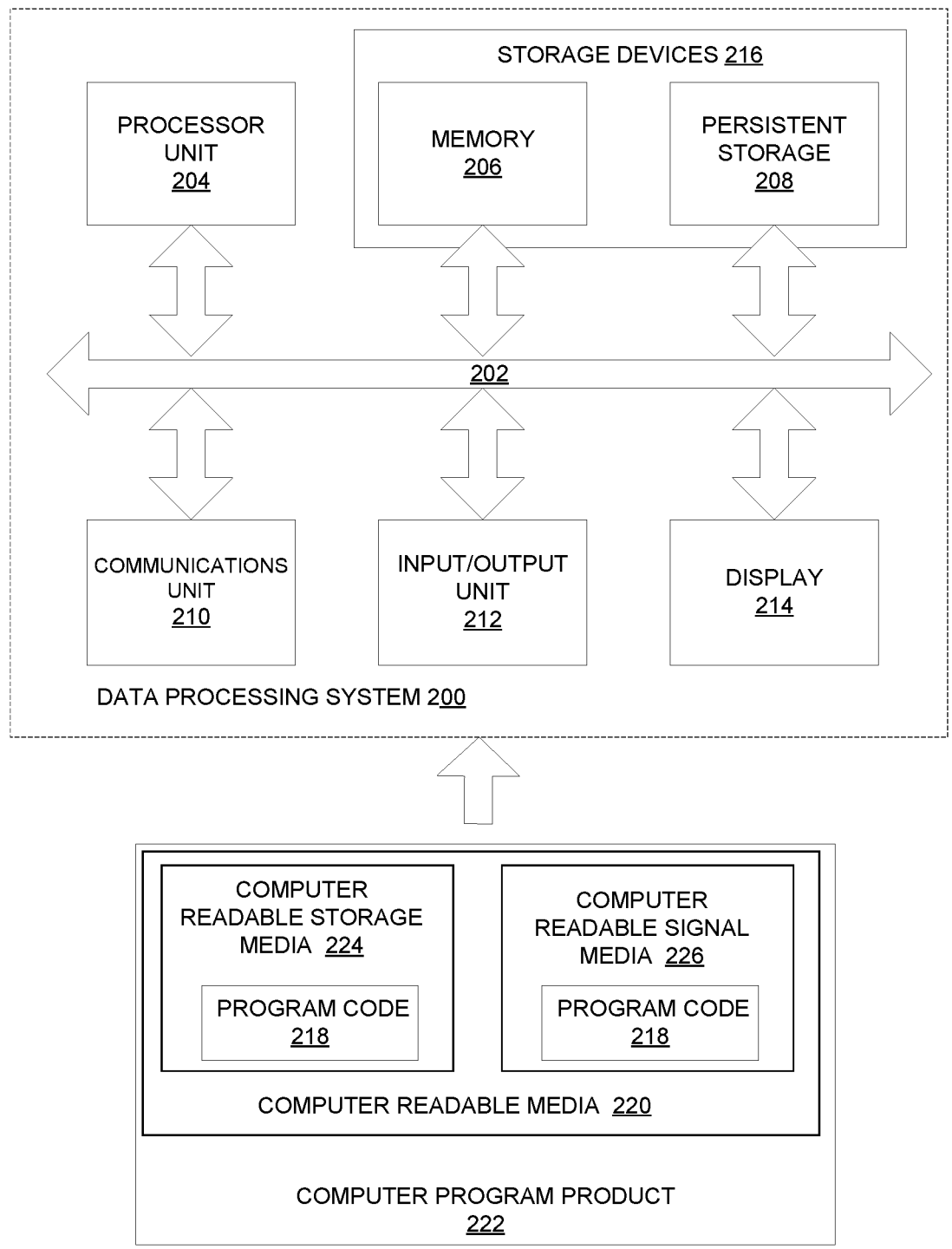
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments providing a capability for identification of sequential browsing operations may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments providing a capability for identification of sequential browsing operations of the disclosure is presented. In this illustrative example, data processing system 200 includes communications fabric 202, which provides communications between processor unit 204, memory 206, persistent storage 208, communications unit 210, input/output (I/O) unit 212, and display 214.

Data processing system 200 is adapted for identifying sequential browsing operations, by receiving information representative of a set of synchronous operations for each of at least two unique sources; generating a graph for each source representative of each operation in the set of synchronous operations for a respective source; performing a document object model reduction for each operation in the set of synchronous operations for each respective source by stripping equivalent document object models from all elements specific to each respective source; calculating a document object model hash for each document object model in the set of synchronous operations using the reduced document object model for each respective source to form a set of document object model identifiers for each respective source; comparing each document object model identifier of one respective source with each document object model identifier of at least one other respective source of the at least two unique sources, to determine whether an equivalent document object model identifier is identified; and responsive to a determination that an equivalent document object model identifier is identified data processing system 200 merges nodes of an equivalent document object model identifier to identify common sequential browsing operations.

Processor unit 204 serves to execute instructions for software that may be loaded into memory 206 providing a capability for identification of sequential browsing operations. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form providing a capability for identification of sequential browsing operations, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, computer executable instructions or computer readable program code that may be read and executed by a processor in processor unit 204. The program code in the different embodiments may be embodied on different physical or tangible computer readable storage media, such as memory 206 or persistent storage 208.

Program code 218 is located in a functional form providing a capability for identification of sequential browsing operations on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for identifying sequential browsing operations is presented. Processor unit 204 receives session data associated with a plurality of sessions, creates a reduced page for each page in a series of pages associated with a first session in the plurality of sessions, creates a hash value associated with each reduced page for each page in the series of pages associated with the first session of the plurality of sessions and compares each hash value associated with the first session to each hash value associated with a respective reduced page in a series of pages associated with a second session in the plurality of sessions. Processor unit 204 determines whether the hash value of the first session is equivalent to the hash value of the second session. Responsive to a determination that the hash value of the first session is equivalent to the hash value of the second session, processor unit 204 identifies an associated page as an equivalent page and merges equivalent pages to create a common sequence without a need to resend requests associated with the session data to a server.

Figure 3:
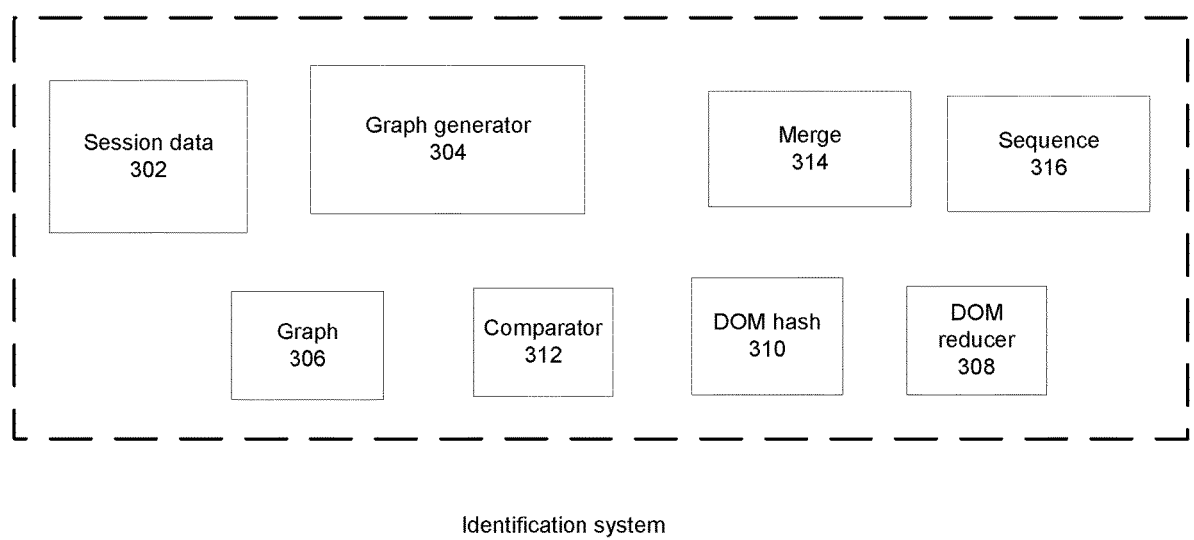
FIG. 3 is a block diagram of an identification system operable for various embodiments of the disclosure.

With reference to FIG. 3 a block diagram of an identification system operable for various embodiments of the disclosure is presented. Identification system 300 is an example of a system for identification of sequential browsing operations using the subject matter of the instant disclosure.

Identification system 300 includes a number of functional components including session data structure 302, graph generator 304, graph data structure 306, DOM hash 308, DOM reducer 310, pattern comparator 312, merge 314 and sequence data structure 316. Identification system 300 leverages support of underlying systems components such as server 104 of network data processing system 100 of FIG. 1 or data processing system 200 of FIG. 2. Identification system 300 may be implemented in hardware, software, or a combination thereof.

Session data structure 302 provides a capability to store a source of input data on which the disclosed process operates. Session data structure 302 contains a stored collection of data representing sets of data associated with web pages traversed during an identifiable period of time associated with a user session. The session data is attributable to a single entity, such as a user and includes a series of operations, some of which may form identifiable and repeatable patterns of operations. For example, a series of operations in a session includes a login, a series of pages browsed and a logoff operation. Although the example described uses a login and login as identifying a start and stop of a session such well-defined events are not always available and other suitable operations may be used to determine a length of a session. A web page may also be referred to as a document wherein a series of web pages may also be referred to as a series of documents.

Graph generator 304 provides a capability of representing a series of operations from session data structure 302 as a set of nodes in a graph format. The graph format therefore associates a given set of operations into a relationship using a set of respective preceding and succeeding operations. Any suitable graphing generator may be used to create the output of graph data structure 306.

Graph data structure 306 is a data structure representing the output of processing of the content of session data structure 302 using a graph building function. The resulting graph is a typical structure including a set of nodes with interconnecting edges.

DOM reducer 308 provides a capability of stripping elements from respective document object models to create basic structures. The basic structures are those that are of a structural nature rather than include presentation of variable content. For example, in a page construct containing a news item the content of a news item is removed leaving a structural entity as a news placeholder. Because the news content can vary each time a page is accessed the content would cause the page to appear as a new page when structurally the page view is the same.

DOM hash 310 provides a capability to compress a document object model representation using a hashing process as is known in the art to produce a hash string as is known in the art. The hashing process is a set of instructions having a capability to create a same compressed string from a longer string of text, such that a hashing process processing of a character string X will always produce hash string Y. DOM hash 310 uses the result of DOM reducer 308 to generate a hash string identifying the respective document object model representing a page. Each value from DOM hash 310 represents a page in an example embodiment. A same reduced document object model received as output from DOM reducer 308 will accordingly generate a same value from DOM hash 310. A set of pages therefore may include one or more equivalent (the same) values.

Pattern comparator 312 provides a capability to perform a comparison of the results provided by DOM hash 310. The pattern comparison operation identifies equivalent values of DOM hash 310 while leaving remaining unique values in a set of values from DOM hash 310. The result of processing a set of DOM hash 310 values is a set of DOM hash 310 values identified as equivalent. The process results may include zero or more equivalent values as dictated by the content of the session data structure 302.

Merge 314 provides a capability of merging equivalent values identified in the set of DOM hash 310 values as processed by pattern comparator 312. The merging operation reduces the number of occurrences in the set of DOM hash 310 values wherein equivalent values are merged into a single corresponding instance. For example, three occurrences of DOM hash value A in the set of DOM hash 310 values are represented by a single DOM hash value A after the merge process completes.

Sequence data structure 316 provides a capability to contain the output of the merge process of merge 314. A sequence is a series of operations in which each operation in the series has an identified interdependency on an adjacent operation in the series. An example of a sequence is shown in a series of operations as sequence 422 of FIG. 4.

Figure 4:
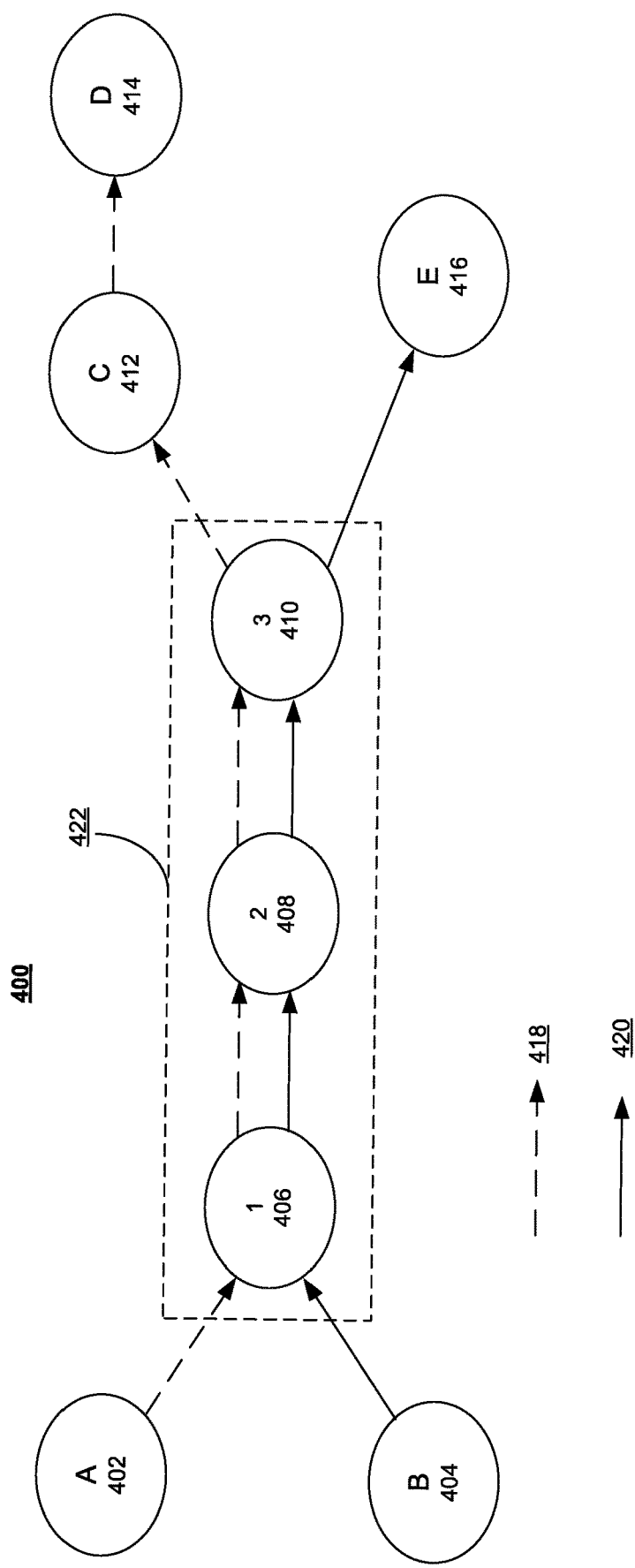
FIG. 4 is a block diagram of using an identification system operable for various embodiments of the disclosure.

With reference to FIG. 4 a block diagram of using an identification system operable for various embodiments of the disclosure is presented. Example 400 represents using identification system 300 of FIG. 3 to identify a common set of operations for a pair of user sessions. The sessions in the example may be for the same user or different users. Although a pair of sessions is used in the example, one skilled in the art may appreciate two or more sessions may be used equally well to accomplish the result of the example.

The disclosed process of using identification system 300 of FIG. 3 leverages organization of session data received from various sources. The organization enables recognition or identification of browsing patterns assumed to be sequences within a series of operations or nodes in a graph.

For example, using an online purchase operation, different users arrive at a purchase operation from different originating pages. A first user (starting at nodeA 402 and following path 418) is interested in the purchase of a book while a second user (nodeB 404 following path 420) is interested in purchasing a piano. However each user needs to complete a same set of requests (including node1 406, node2 408 and node3 410) to complete a respective purchase transaction. When the purchase operation is completed each user is capable of going a separate way, as in the first user continues to node 412 and node 414, while the second user traverses to node 416. While in some cases the users may continue to perform similar operations a dependency validation process may be used to optimize a sequence of operations further.

The example using the disclosed identification system 300 of FIG. 3 is optimal because the process enables identification of sequences without a need for resending any of the requests for verification.

Figure 5:
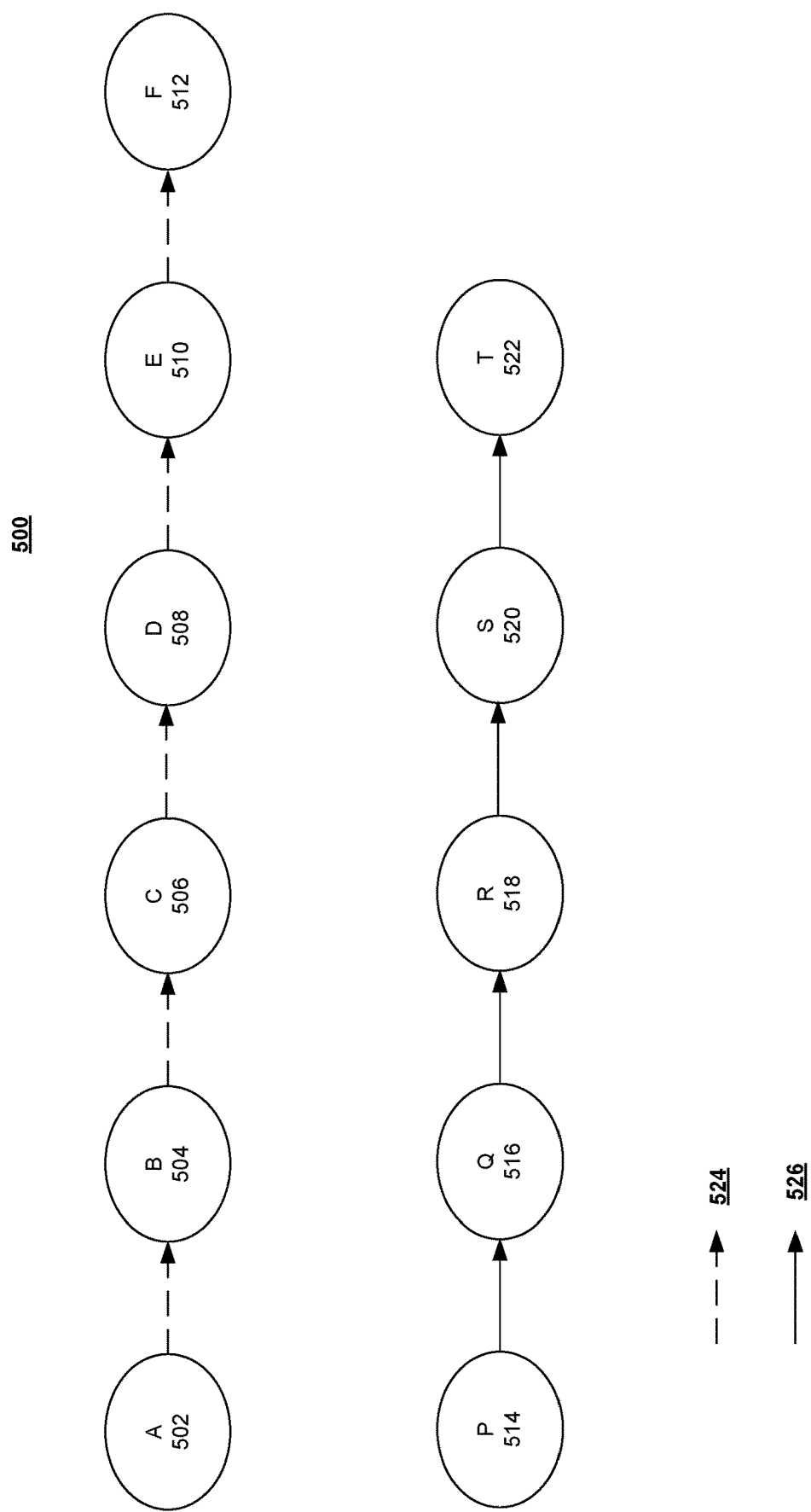
FIG. 5 is a block diagram of graphs generated using an identification system operable for various embodiments of the disclosure.

With reference to FIG. 5 a block diagram of graphs generated using an identification system operable for various embodiments of the disclosure is presented. Example 500 represents using identification system 300 of FIG. 3 to generate a graph using data representing a pair of user sessions.

The disclosed process of identification constructs a graph from user browsing data collected from various sources and typically stored in a session data structure. Accuracy of the disclosed process relies on correctness of the browsing data. For example, in a case where a user abandons a session in the middle of the session, the disclosed process identifies a shorter pattern than actually required. Accordingly the accuracy of the disclosed process improves as the amount of user session data collected increases.

Example 500 includes session data associated with a first user and session data associated with a second user. For simplicity, only two user sessions are used to demonstrate the process, but the process works equally well for two or more user sessions. Session data associated with the first user is represented in a graph by a series of operations identified as nodeA 502, nodeB 504, nodeC 506, nodeD 508, nodeE 510, and nodeF 512. The series of session data associated with the first user defines a path in the first graph identified as path 524.

Session data associated with the second user is represented in a second graph by a series of operations identified as nodeP 514, nodeQ 516, nodeR 518, nodeS 520, and nodeT 522. The series of session data associated with the second user defines a path in the second graph identified as path 526.

Information including the session data may be collected by any suitable collection mechanism including logging activity, tracing activity and testing. Session data is typically stored and processed using the disclosed process however the session data may also be processed in real time without storing and processing offline without departing from the disclosed process.

The session data associated with the first user and the session data associated with the second user form separate series of operations, wherein the operations may be referred to as pages visited in the example of the purchase transaction. The session data does not require a same number of nodes for each series being processed. However a longer series typically provides more accurate results in identifying whether a common sequence exists between the two or more series. The example depicts two graphs, however a single graph may be used identifying the two or more series.

Figure 6:
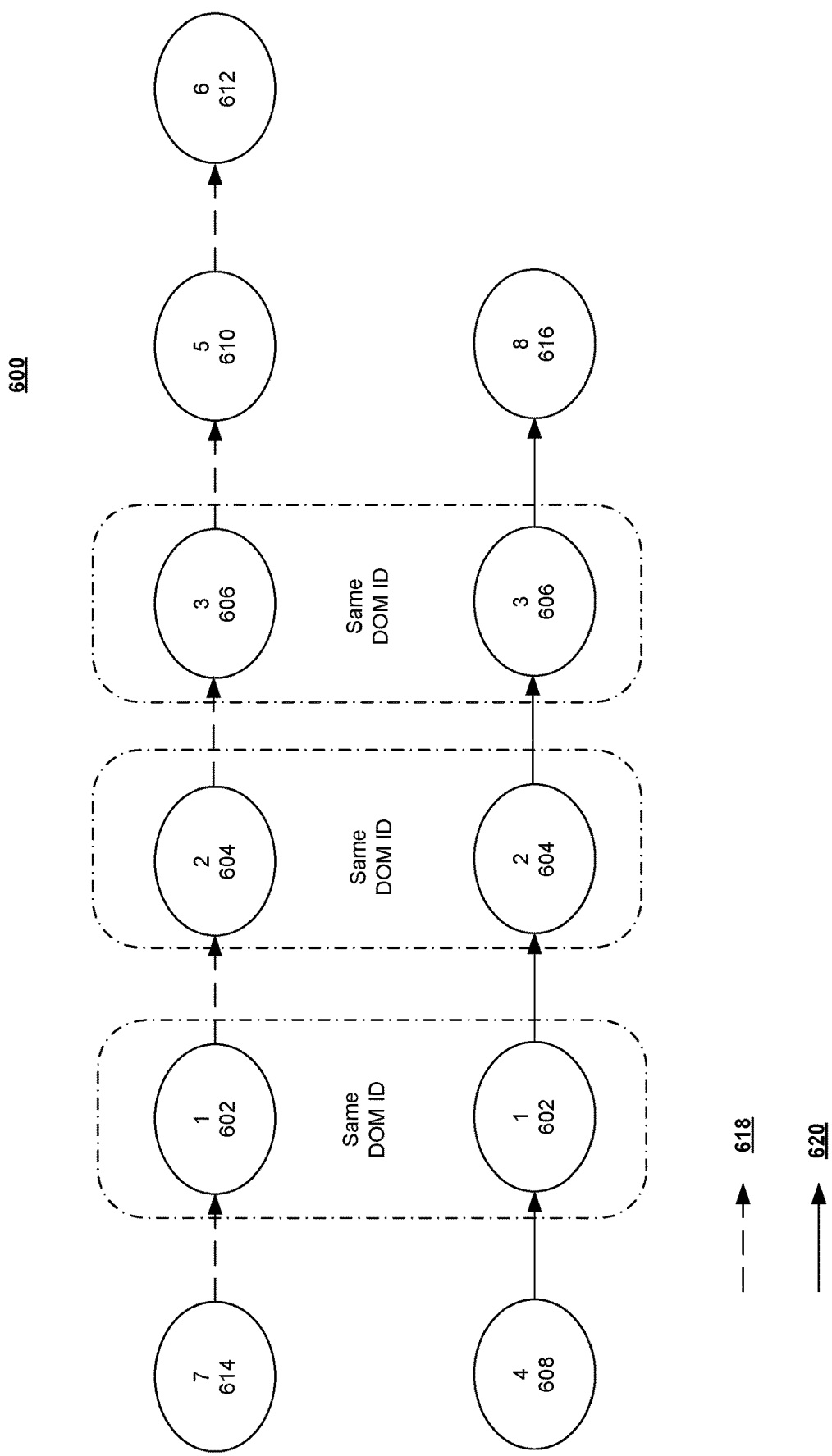
FIG. 6 is a block diagram of using graphs in an identification system operable for various embodiments of the disclosure.

With reference to FIG. 6 a block diagram of using graphs in an identification system operable for various embodiments of the disclosure is presented. Example 600 represents using the graphs as generated in example 500 of FIG. 5 to identify a common set of operations for a pair of user sessions.

Example 600 represents session data associated with a first user in a graph by a series including node7 614, node1 602, node2 604, node3 606, node5 610, and node6 612. The series of session data associated with the first user defines a path in the first graph identified as path 618. Session data associated with the second user is represented in a second graph by a series including node4 608, node1 602, node2 604, node3 606, and node8 616. The series of session data associated with the second user defines a path in the second graph identified as path 620.

Equivalent responses are identified in the sets of session data being processed. In an embodiment, a document object model (DOM) reduction process is used to strip equivalent DOMs from all elements specific to each user session (such as input values) in the set of session data. For example, DOM reducer 308 of identification system 300 of FIG. 3 is used to filter or reduce elements of a DOM instance to create a reduced DOM. A reduced DOM includes structural elements, which typically do not vary.

For example, in one embodiment the reduction process identifies page elements and stores the identified page elements in memory while retaining an original layout and order. Page elements, which are deemed not significant, are filtered out and accordingly removed from memory. In an alternate embodiment, the filtered page elements are left in memory but ignored in future processing steps.

The elements to be filtered are configured by configuration settings (also referred to herein as filter criteria) stored in a storage device as filters. For example, filters include a list of HTML nodes (for example, img) to be filtered. In the example embodiment, a series of filters may be used to exclude some elements while including others. For example, a filter may be configured to eliminate all <li> nodes while a second filter may be created to include all <li> nodes, which contain an attribute "important." By using both exclusive filters and inclusive filters all <li> nodes may be excluded except for <li> nodes with the attribute of "important." The filters may include a list of element names, and/or one or more XML Path Language (XPath) instructions. The XPath instructions include one or more strings of instructions indicating a particular HTML node by node name, attribute name, attribute value, or HTML element value including display text within the HTML page. The XPath command may be used to explicitly exclude particular segments of the HTML as is known in the art. In addition, the filters may include regular expression (regex) instructions as is known in the art. Regex instruction provide the text parsing and filtering capabilities which may be used to filter the HTML page by text and/or wildcard strings as is known in the art.

Other methods of identifying elements to be excluded or included as is known in the art may be used to configure filters. In an additional embodiment, the filters may include a combination of one or more of a list of HTML elements, XPath instructions, and regex instructions in combination.

Elements remaining are converted to a string of text representing a page identifier. The page identifier (DOM id) may be created by any method of processing a page into an identifier (ID) that can be repeated by subsequent processing of the same page information and configuration data such that when the page is processed a second time the same unique ID is produced. The page identifier is processed using a hashing algorithm as is known in the art to produce a hash string as is known in the art. The hashing algorithm is a set of instructions that create the same compressed string from a longer strong of text, such that a hashing algorithm processing of character string X will always produce hash string Y.

The disclosed process calculates a DOM hash of a reduced DOM. The DOM hash value for a unique DOM is a unique value. A DOM hash value for a non-unique DOM is a non-unique value. Upon a comparison of DOM hash values, DOM identifiers, which hash to a same value are deemed to provide equivalent responses. Accordingly a set of equivalent responses in a same order in two or more sets of session data defines a sequence, as in node1 602, node2 604, node3 606 of example 600.

The series of session data associated with the first user and the series of session data associated with the second user is processed to identify equivalent responses. Equivalent responses are depicted in example 600 as node1 602, node2 604, node3 606 common to session data associated with the first user and session data associated with the second user. Example 600 shows all responses for session data associated with the first user and session data associated with the second user with corresponding equivalent DOM identifiers.

Figure 7:
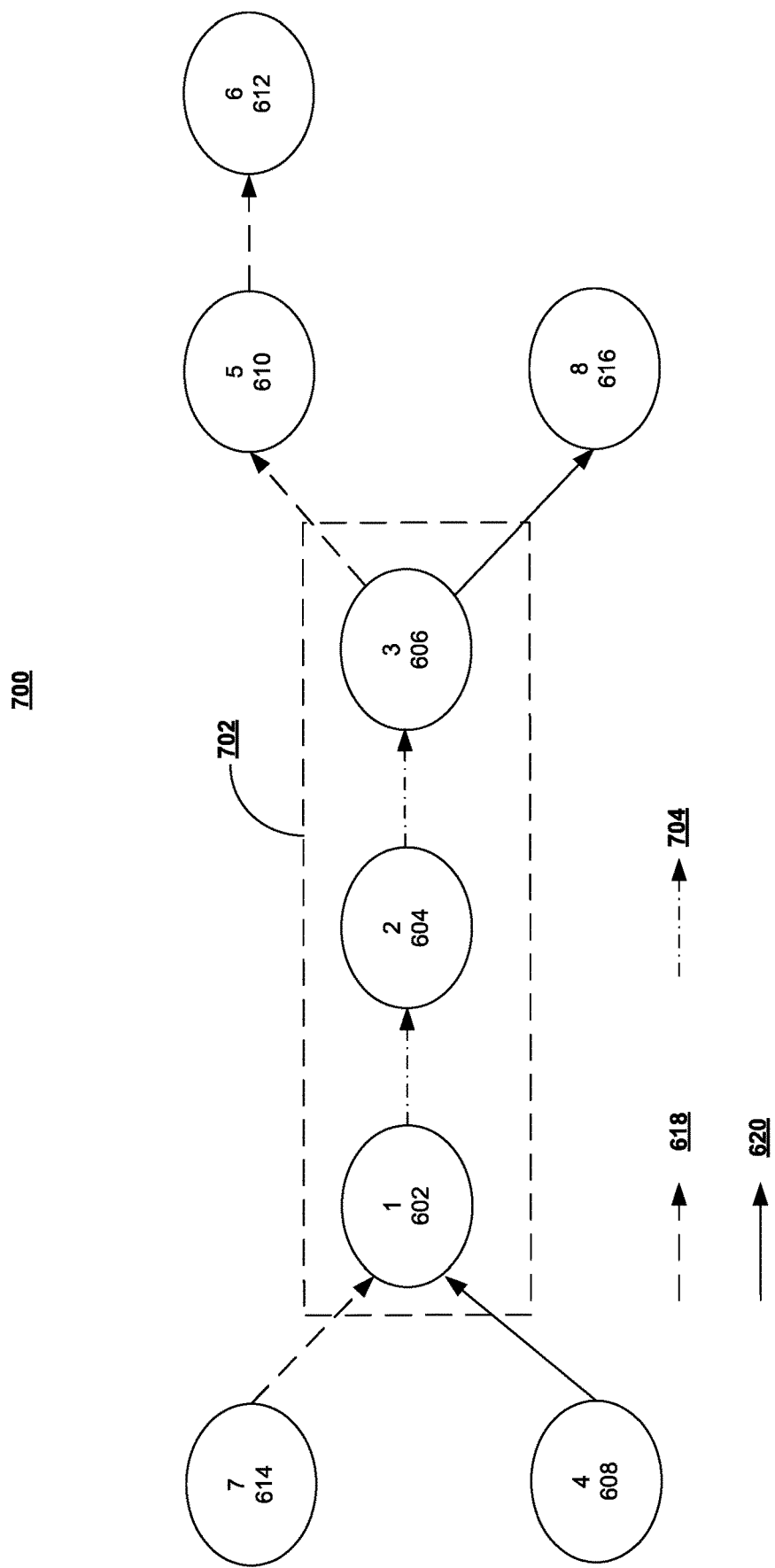
FIG. 7 a block diagram of merging common nodes in an identification system operable for various embodiments of the disclosure.

With reference to FIG. 7 a block diagram of merging common nodes in an identification system operable for various embodiments of the disclosure is presented. Example 700 represents using identification of equivalent nodes in example 600 of FIG. 6 to merge common operations for a pair of user sessions.

Using information obtained to identify session data associated with the first user and session data associated with the second user with corresponding equivalent DOM identifiers the disclosed process merges nodes having equivalent DOM identifiers.

Equivalent DOM identifiers are merged to generate a common path for a defined sequence of equivalent DOM identifiers. Example 700 depicts a result of a merge operation using the two sets of node1 602, node2 604, node3 606 of example 600 of FIG. 6. Path 618 and path 620 are merged into a single path 704 through the defined sequence 702.

Figure 8:
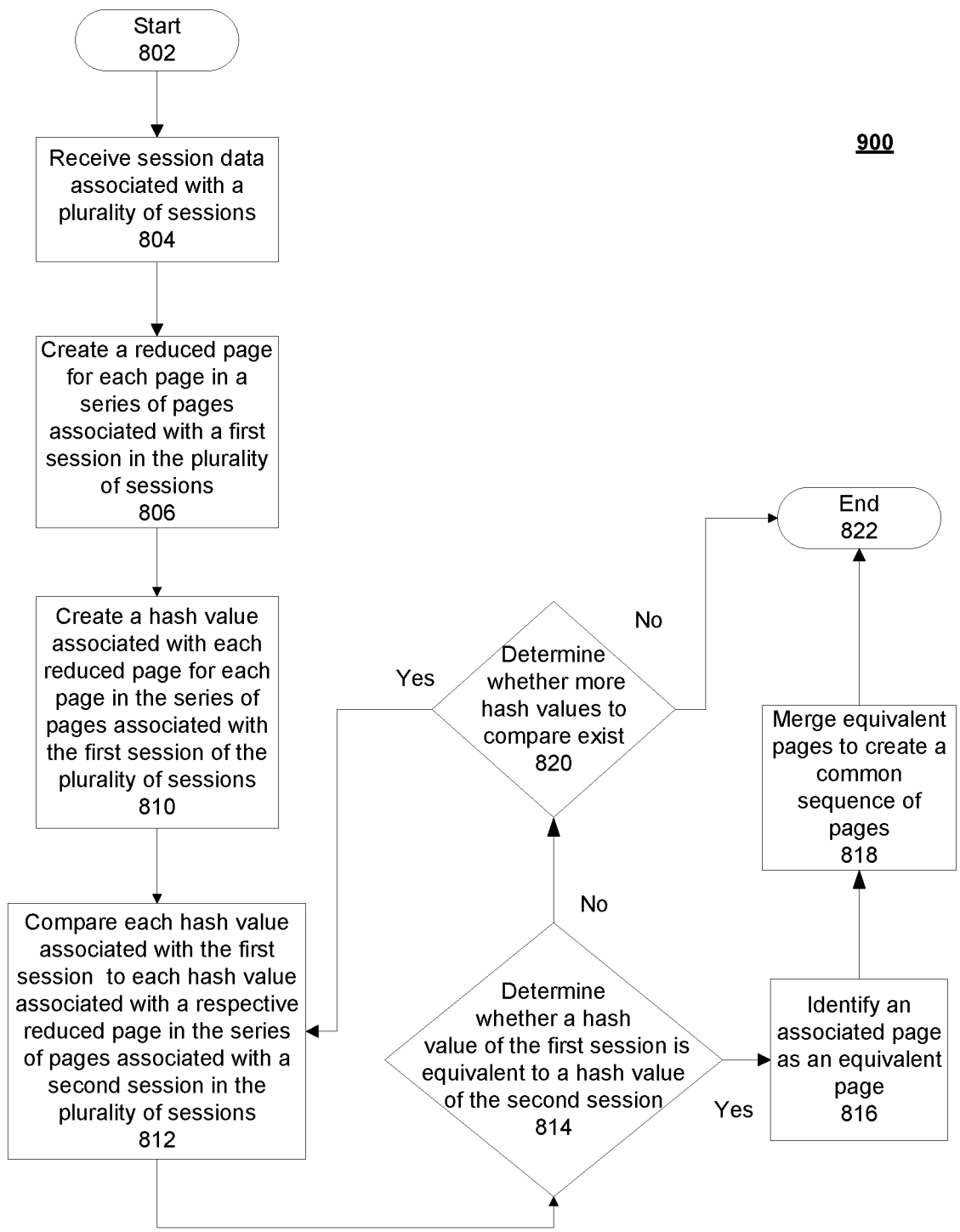
FIG. 8 is a flowchart of a process for identifying sequential browsing operations operable for various embodiments of the disclosure.

With reference to FIG. 8 a flowchart of a process for identifying sequential browsing operations operable for various embodiments of the disclosure is presented. Process 800 represents an example of identification of equivalent nodes or pages using identification system 300 of FIG. 3 for a pair of user sessions. The described process works equally well for comparisons of session data representing more than two sessions.

Process 800 begins (step 802) and receives session data associated with a plurality of sessions (step 804). The received information is representative of a set of synchronous operations for each of at least two unique sources. Each series of session data in the plurality of sessions is associated with an identifiable entity. For example, a series of entries representing web pages associated with a particular purchase transaction for a first particular user includes a series of session data for a first user. Another series of entries representing web pages associated with a particular purchase transaction for a second particular user includes a series of session data for a second user. Together the combination of series represents a plurality of sessions, with each series being uniquely attributable to a respective user. The user, although described as a first and second user may be the same user and not necessarily a different user.

Process 800 creates a reduced page for each page in a series of pages associated with a first user session in the plurality of sessions (step 806). Creating a reduced page may also be referred to as DOM reduction, wherein the page structure is represented in a document object model. Filtering elements of a respective page to distinguish structural items from items, which are not structural, creates the reduced page. Elements that are specific to a user are also removed (for example, input values). Items that are not structural typically vary from page view to page view, for example, inclusion of a news article in a portion of page causes the page to be unnecessarily interpreted as different from a same page with a different news article in the same portion. The elements of the page are processed in order to maintain structural relations.

Identifiers of the elements of the reduced page are then used to form a text string representative of the reduced page. The text string therefore is an identifier of the reduced DOM.

A configuration data structure is used to store filtering information. For example, filter information may describe hypertext markup language or extensible markup language identifiers to be included or excluded as well as combinations thereof in a reduced page. In addition regular expressions may also be used to define conditional processing used to determine elements including a reduced page.

Process 800 creates a hash value associated with each reduced page for each page in the series of pages associated with the first session of the plurality of sessions (step 810). The text string representative of the reduced page (reduced DOM) is used as input to a hashing process to generate a hash value associated with a respective page. The hash value of the text string represents a hash value of the DOM identifier.

Process 800 compares each hash value associated with the first session to each hash value associated with a respective reduced page in the series of pages associated with a second session in the plurality of sessions (step 812). Process 800 determines, for each comparison, whether a hash value of the first session is equivalent to a hash value of the second session (step 814). A comparison using representative pairs of sessions is performed until all pairs of sessions in the plurality of sessions have been processed.

Responsive to a determination that the hash value of the first session is equivalent to a hash value of the second session, process 800 identifies an associated page as an equivalent page (step 816). Process 800 merges equivalent pages to create a common sequence of pages (step 818). The common sequence of pages represents pages having a same hash value and therefore assumed to be the same. Process 800 terminates thereafter (step 822).

Responsive to a determination that the hash value of the first session is not equivalent to a hash value of the second session, process 800 determines whether more hash values to compare exist (step 820). Responsive to a determination that more hash values to compare exist, process 800 loops back to perform step 812 as before. Responsive to a determination that no more hash values to compare exist, process 800 terminates in step 822 as before.

Process 800 is an example of a computer-implemented process for identifying sequential browsing operations including receiving information representative of a set of synchronous operations for each of at least two unique sources and generating a graph for each source representative of each operation in the set of synchronous operations for a respective source. The computer-implemented process performs a document object model reduction for each operation in the set of synchronous operations for each respective source of session data by stripping equivalent all elements specific to each respective source from the document object models and calculates a document object model hash value for each document object model in the set of synchronous operations using the reduced document object model (the text string) for each respective source to form a set of document object model identifiers for each respective source. The computer-implemented process compares each document object model identifier of one respective source with each document object model identifier of at least one other respective source of the at least two unique sources, to determine whether an equivalent document object model identifier is identified. Responsive to a determination that an equivalent document object model identifier is identified, the computer-implemented process merges nodes of an equivalent document object model identifier to identify common sequential browsing operations. The disclosed process accordingly enables identification of common sequences of pages across a plurality of session data without a need to resend requests associated with the session data to a server.

Thus is presented in an illustrative embodiment a computer-implemented process for identifying sequential browsing operations. The computer-implemented process receives session data associated with a plurality of sessions, creates a reduced page for each page in a series of pages associated with a first session in the plurality of sessions, creates a hash value associated with each reduced page for each page in the series of pages associated with the first session of the plurality of sessions and compares each hash value associated with the first session to each hash value associated with a respective reduced page in a series of pages associated with a second session in the plurality of sessions. The computer-implemented process determines whether the hash value of the first session is equivalent to the hash value of the second session. Responsive to a determination that the hash value of the first session is equivalent to the hash value of the second session, the computer implemented process identifies an associated page as an equivalent page and merges equivalent pages to create a common sequence without a need to resend requests associated with the session data to a server.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the embodiments of the present invention has been presented for purposes of illustration and description, but is not intended to be exhaustive or limited to the embodiments of the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The embodiments of the invention can take the form of an entirely hardware embodiment, an entirely software embodiment or an embodiment containing both hardware and software elements. In a preferred embodiment, embodiments of the invention are implemented in software, which includes but is not limited to firmware, resident software, microcode, and other software media that may be recognized by one skilled in the art.

It is important to note that while the embodiments of the present invention have been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions including program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process, comprising:
   receiving session data derived from a first session and a second session;
   filtering elements from a page in a first series of pages associated with the first session to generate a reduced page of the page;
   hashing the reduced page to create a hash value for the reduced page;
   comparing the hash value to each hash value associated with a respective reduced page in a second series of pages associated with the second session;
   identifying equivalent pages, respectively found within the first and second series of pages, upon a determination that hash values of the equivalent pages are equivalent; and
   merging the equivalent pages to create a common sequence, wherein
   the hash values of the equivalent pages are determined to be equivalent.

2. The process of claim 1, wherein
   the filtering is repeated for each page in the first series of pages, and
   the hashing is repeated for each reduced page.

3. The process of claim 1, wherein
   the session data includes
   first data representative of a set of synchronous operations for a first user, and
   second data representative of a set of synchronous operations for a second user different than the first user.

4. The process of claim 1, wherein
   the filtering removes non-structural elements from the page.

5. The process of claim 1, wherein
   the filtering removes elements from the page that are specific to the first session.

6. The process of claim 1, wherein
   the reduced page is a reduced document object model.

7. The process of claim 1, wherein
   the filtering processes each element of the page in original order.

8. A computer program product, comprising:
   a hardware storage device having stored therein computer executable program code,
   the computer executable program code, which when executed by a computer hardware system, causes the computer hardware system to perform:
   receiving session data derived from a first session and a second session;
   filtering elements from a page in a first series of pages associated with the first session to generate a reduced page of the page;
   hashing the reduced page to create a hash value for the reduced page;
   comparing the hash value to each hash value associated with a respective reduced page in a second series of pages associated with the second session;
   identifying equivalent pages, respectively found within the first and second series of pages, upon a determination that hash values of the equivalent pages are equivalent; and
   merging the equivalent pages to create a common sequence, wherein
   the hash values of the equivalent pages are determined to be equivalent.

9. The computer program product of claim 8, wherein
   the filtering is repeated for each page in the first series of pages, and
   the hashing is repeated for each reduced page.

10. The computer program product of claim 8, wherein
    the session data includes
    first data representative of a set of synchronous operations for a first user, and
    second data representative of a set of synchronous operations for a second user different than the first user.

11. The computer program product of claim 8, wherein
    the filtering removes non-structural elements from the page.

12. The computer program product of claim 8, wherein
    the filtering removes elements from the page that are specific to the first session.

13. The computer program product of claim 8, wherein the reduced page is a reduced document object model.

14. The computer program product of claim 8, wherein the filtering processes each element of the page in original order.

* * * * *